United States Patent Office 3,048,575
Patented Aug. 7, 1962

3,048,575
PROCESS FOR THE MANUFACTURE OF ETHYLENE POLYMERS
Jacobus P. Schuhmacher, Sittard, and Hendrik Hendriks, Geleen, Netherlands, assignors to Stamicarbon N.V., Heerlen, Netherlands
No Drawing. Filed June 25, 1956, Ser. No. 593,347
Claims priority, application Netherlands June 28, 1955
4 Claims. (Cl. 260—94.9)

The present invention relates to novel improvements in the preparation of normally solid polymers of ethylene, i.e. polymers which are solid at room temperature.

Belgian Patent No. 533,362 describes a process for preparing normally solid ethylene polymers by contacting ethylene with a catalyst dissolved or suspended in an inert organic solvent, the catalyst comprising the reaction product of trialkyl-aluminum and a compound composed of a metal of the 4th, 5th or 6th sub-groups of the periodic system. Typically suitable metals are thorium, uranium, titanium, zirconium and chromium.

According to Belgian Patent No. 533,362, the polymerization is carried out at low pressure, generally less than 10 atmospheres. Atmospheric pressure is preferred and the polymerization temperature is desirably maintained above 50° C.

A modification of the above-mentioned process is described in Belgian Patent No. 534,792 wherein the trialkyl-aluminum is replaced by certain other alkyl-aluminum compounds, preferably the monohalogenide of dialkyl- or diaryl-aluminum.

It has now been found that ethylene polymers, which are solid at room temperature, may be advantageously prepared by using as the polymerization catalyst, the reaction product formed by dissolving in an organic solvent at least one compound of a metal selected from the 4th, 5th, and 6th sub-groups of the periodic system, as referred to in Belgian Patent No. 533,362, and reacting the said compound with at least one dialkyl compound selected from the group consisting of zinc and cadmium dialkyls. In other words, the present invention comprises the substitution, in whole or in part, of a zinc or cadmium dialkyl for the aluminum alkyl derivatives utilized in the above-mentioned Belgian patents.

The discovery that zinc and/or cadmium dialkyls can be effectively utilized for the purposes described herein is unexpected, particularly since Belgian Patent No. 533,362 indicates that the results described therein are specific to the use of aluminum derivatives. Surprisingly, the use of the cadmium and/or zinc dialkyls in the manner herein described gives a product which is substantially identical with the product of Belgian Patent No. 533,362, and in some cases superior thereto, in molecular weight, melting point, and other important characteristics. Furthermore, when compared with the procedures using aluminum alkyl compounds, the present process offers the advantage that only relatively small amounts, less than 1 mol and preferably 0.2–0.4 mol, of the dialkyl-compound of zinc and cadmium are needed per mol of the metal compound of the 4th–6th groups. Substantially greater amounts of aluminum alkyl compound, in particular, from 8 to 12 mols of the aluminum compound per mol of metal compound, are utilized in Belgian Patent 533,362.

Any of the metal compounds from the 4th–6th groups referred to in Belgian Patent 533,362 may be used in the present invention. Titanium compounds, particularly titanium tetrachloride, are preferred. However, compounds of, for example, zirconium, thorium, uranium, vanadium, niobium, tantalum, and chromium, which are soluble in inert organic solvents, may also be satisfactorily utilized. As typical illustrations there may be mentioned the chlorides, oxychlorides, acetylacetonates, etc., of the above-listed metals.

Suitable dialkyl compounds of zinc and cadmium include diethyl zinc, diethyl cadmium, dipropyl cadmium, dimethyl zinc, dihexyl cadmium, dibutyl zinc, and diisopropyl cadmium. The alkyl groups may be the same or different and preferably contain up to six carbon atoms although longer carbon chains may also be utilized.

The catalyst comprising one or more metal compounds of the 4th–6th group and one or more zinc and/or cadmium dialkyls is preferably dissolved in an inert organic solvent comprising a saturated hydrocarbon such as pentane, hexane and cyclohexane. However, it is possible to use other solvents, e.g., benzene, xylene or halogenated aromatic hydrocarbons such as o-dichloro-benzene, chlorinated naphthalene. Generally speaking, any organic liquid solvent is suitable for use herein as long as it is inert under the conditions of reaction and is capable of dissolving the compound of the metal of the 4th, 5th, and 6th subgroups of the periodic system. The amount of solvent utilized can be widely varied but preferably is kept at a minimum consistent with satisfactory operation. Usually from 5 to 200 milli mols of the compound of the metal selected from the 4th, 5th, and 6th subgroups of the periodic system per liter of solvent are satisfactory.

The polymerization may be carried out by passing gaseous ethylene into a solution or suspension of the catalyst in the inert liquid, preferably while stirring in order to promote the dividing of the catalyst in the liquid. By cooling the reaction mixture, a polymerization temperature below 50° C. may be easily maintained. However, if desired, higher temperatures, up to about 80° C., may also be used. Preferably the polymerization is carried out within the range of 20° to 30° C. but temperatures as low as 0° C. and below, for example, −10° C. or −20° C., are possible. The lower temperatures permit better dissolution of the ethylene in the reaction mixture but the rate of polymerization is decreased. A desirable polymerization rate is realized if the reaction mixture is maintained at room temperature, i.e., within the 20°–30° C. range stated above, by moderate cooling.

The polymerization pressure can be widely varied. Atmospheric pressure as well as a pressure below 10 atmospheres is satisfactory and somewhat higher pressures, e.g., 20, 50, or 100 atmospheres, are also advantageous since, at such pressures, the solubility of ethylene is greater, thus increasing the rate of polymerization. Pressures as high as 200 atmospheres may be utilized although, as indicated, such elevated pressures are not essential.

In a preferred embodiment of the invention, only part of the zinc or cadmium dialkyl is used at the start of the polymerization; further amounts thereof being added during the polymerization. Preferably, this addition of the dialkyl is carried out continuously. It is usually advantageous to have from 10 to 20% of the zinc and/or cadmium dialkyl which is to be used present at the start of the polymerization, the remainder being added continuously or in equal portions during the course of the reaction at intervals of, for example, one-half hour.

The gaseous ethylene may be contacted with the catalyst at varying rates depending upon other reaction conditions. Preferably, however, the ethylene addition takes place continuously and at such a rate that the ethylene is substantially completely absorbed by the reaction mixture. Any gas issuing from the reaction vessel may be recycled, as for example, by suitable pump means, and reintroduced into the reaction mixture. Typically suitable feed rates for the ethylene comprise contacting per hour from 0.1 to 50 liters of ethylene (measured at 0° and 1 atmosphere) with one millimol of the compound of the metal selected from the 4th, 5th, and 6th subgroups of the periodic system.

The polymerization may be continued until such an amount of polyethylene has been formed that the reaction mixture is difficult to stir. Subsequently, the polyethylene can be removed from the reaction mixture by mechanical means, e.g., by centrifuging or filtering. After washing of the resulting product the polyethylene is obtained as a finely-divided white substance. The molecular weight and other characteristics of the product vary over a wide range. Generally speaking, however, the polyethylene obtained herein corresponds with the products described in Belgian Patent 533,362.

The invention is illustrated, but not limited, by the following examples:

*Example I*

While stirring, ethylene was introduced into a mixture of 5 parts by weight of titanium tetrachloride and 1 part by weight of diethyl-zinc dissolved in 150 parts by weight of cyclohexane. By cooling the temperature was maintained at 20–30° C. The reaction was carried out at 1 atmosphere.

The ethylene was supplied at the rate of 4 liters (measured at 0° C. and 1 atmosphere) per hour.

After 1 hour the supply of ethylene was stopped and the resulting reaction mixture, which appeared as a dark brown slurry, was filtered. The raw polyethylene was washed with cyclohexane and subsequently with methanol. The traces of catalyst that had remained behind in the product were removed by stirring the product in dilute acid, namely, 2 N-hydrochloric acid, and heating the suspension to 90–100° C. After filtration and washing with water 5 parts by weight of polyethylene were obtained as a fine-grained white product of approximately a molecular weight of 100,000.

*Example II*

Five parts by weight of titanium tetrachloride and 0.5 part by weight of dipropyl-cadmium were dissolved in 150 parts by weight of cyclohexane. At a temperature of 30–35° C. and at atmospheric pressure ethylene was introduced, while stirring, at the rate of 4 liters (measured at 0° C. and 1 atmosphere) per hour during three hours.

After ½, 1, 1½, 2, and 2½ hours, 0.1 part by weight of dipropyl-cadmium, dissolved in 10 parts by weight of cyclohexane, was added to the reaction mixture. After the reaction had been stopped the resulting polymer was separated out and purified in the manner described in Example I. As a final purification, washing in ethanol was applied.

The yield was 15 parts by weight of polyethylene in the form of a white powder.

*Example III*

The process of Example II was repeated except that the 0.5 part by weight of dipropyl-cadmium was replaced by 0.25 part diethyl-zinc and 0.25 part dipropyl-cadmium. The product obtained was substantially identical with that of Example II.

It will be appreciated that various modifications may be made in the invention as described above without deviating from the scope thereof as defined in the following claims wherein we claim:

1. A catalyst for polymerizing ethylene comprising the reaction product formed by dissolving in an inorganic solvent titanium tetrachloride and a cadmium dialkyl, said alkyl radical being selected from the group consisting of those having 2 to 4 carbon atoms, there being used 0.2 to 0.4 mol of cadmium dialkyl per mol of the titanium compound, the reaction being conducted in the temperature range of 20–35° C.

2. The catalyst of claim 1, wherein the cadmium dialkyl is dipropyl cadmium.

3. In a process for polymerizing ethylene to obtain a normally solid polymer, in which process the ethylene is contacted with a catalyst distributed in an inert organic liquid medium, the improvement in said proces which comprises: using as catalyst the reaction product formed by dissolving in said medium titanium tetrachloride and cadmium dialkyl, said alkyl radical being selected from the group consisting of those having 2 to 4 carbon atoms, there being used 0.2 to 0.4 mol of the cadmium dialkyl per mol of the titanium compound and conducting the reaction in the temperature range of 20–35° C.

4. The process of claim 3 wherein the cadmium dialkyl is dipropyl cadmium.

References Cited in the file of this patent

UNITED STATES PATENTS

| | | |
|---|---|---|
| 1,473,543 | Clancy | Nov. 6, 1923 |
| 1,914,558 | Craver | June 20, 1933 |
| 2,691,647 | Field et al. | Oct. 12, 1954 |
| 2,710,854 | Seelig | June 14, 1955 |
| 2,827,446 | Breslow | Mar. 18, 1958 |
| 2,905,645 | Anderson et al. | Sept. 22, 1959 |

FOREIGN PATENTS

| | | |
|---|---|---|
| 534,888 | Belgium | Jan. 31, 1955 |

UNITED STATES PATENT OFFICE
CERTIFICATE OF CORRECTION

August 7, 1962

Patent No. 3,048,575

Jacobus P. Schuhmacher et al.

It is hereby certified that error appears in the above numbered patent requiring correction and that the said Letters Patent should read as corrected below.

Column 4, line 17, for "inorganic" read -- inert organic --.

Signed and sealed this 5th day of March 1963.

(SEAL)
Attest:

ESTON G. JOHNSON

Attesting Officer

DAVID L. LADD

Commissioner of Patent